United States Patent [19]

Kulkarni

[11] Patent Number: 5,495,386
[45] Date of Patent: Feb. 27, 1996

[54] ELECTRICAL COMPONENTS, SUCH AS CAPACITORS, AND METHODS FOR THEIR MANUFACTURE

[75] Inventor: Sudhir Kulkarni, Myrtle Beach, S.C.

[73] Assignee: AVX Corporation, Myrtle Beach, S.C.

[21] Appl. No.: 101,899

[22] Filed: Aug. 3, 1993

[51] Int. Cl.$^6$ .................................................... H01G 4/01
[52] U.S. Cl. ........................ 361/303; 361/307; 361/314; 361/321.1; 29/25.42
[58] Field of Search ..................... 361/271, 301.1, 361/303, 304, 305, 307, 308.1, 309, 311–315, 321.1, 321.5, 322, 524, 529, 528; 29/25.42, 610.1, 621; 338/20, 21; 427/79, 80, 81, 101

[56] References Cited

U.S. PATENT DOCUMENTS

| | | | |
|---|---|---|---|
| 2,299,228 | 10/1942 | Gray et al. | 361/303 |
| 3,302,073 | 1/1967 | Broodo . | |
| 3,325,699 | 6/1967 | Hellicar | 361/322 |
| 3,346,789 | 10/1967 | Robinson | 361/304 |
| 3,654,533 | 4/1972 | della Porta et al. | 361/303 |
| 4,160,284 | 7/1979 | Deffeyes et al. . | |
| 4,451,869 | 5/1984 | Sakabe et al. | 361/309 |
| 4,455,590 | 6/1984 | Alexander . | |
| 4,652,967 | 3/1987 | Sakabe et al. . | |
| 5,001,598 | 3/1991 | Constantine . | |
| 5,005,107 | 4/1991 | Kobashi et al. . | |

FOREIGN PATENT DOCUMENTS

| | | | |
|---|---|---|---|
| 280707 | 3/1914 | Germany | 361/303 |
| 745892 | 3/1956 | United Kingdom | 361/303 |
| 1165510 | 10/1969 | United Kingdom | 361/524 |

*Primary Examiner*—Marvin M. Lateef
*Assistant Examiner*—Gregory L. Mills
*Attorney, Agent, or Firm*—Loeb and Loeb

[57] ABSTRACT

An improved electrical component, such as a capacitor, is fabricated from a porous plug formed from metal impregnated with a ceramic material. In the case of a capacitor, the ceramic material is a dielectric composition. A metal which does not oxidize at temperatures close to the ceramic sintering temperature can be used to fabricate the plug. A first lead is attached directly to the plug. The plug is infiltrated and coated with a layer of the ceramic material. The plug which is infiltrated and coated with ceramic material is fired to sinter the dielectric. A second lead is then attached to the layer of ceramic and if a dielectric ceramic composition was used, then a capacitor is formed.

15 Claims, 1 Drawing Sheet

ELECTRICAL COMPONENTS, SUCH AS CAPACITORS, AND METHODS FOR THEIR MANUFACTURE

BACKGROUND OF THE INVENTION

1. Field of the Invention

The present invention relates to electrical components, such as capacitors, and to methods for their manufacture wherein a porous conducting body is impregnated with a ceramic material, where the ceramic material is not an oxidized form of the body.

2. The Related Art

There are numerous ways to construct electrical components such as ceramic capacitors. In a conventional multilayer capacitor-making process, green (unfired) ceramic sheets having thicknesses of several hundred micrometers or less are prepared by tape casting, for example. Noble metal electrodes are screen printed onto the green ceramic by means of a conductive ink. The metals used must have relatively high melting points and be nonreactive at elevated temperatures, because the dielectric in the capacitor must be sintered at elevated temperatures.

In multilayer capacitors, sheets of green ceramic and electrodes are stacked on top of each other, with the electrodes staggered and partially overlapping each other, such that every other electrode extends to one end of the ceramic. Green ceramic sheets may be applied to the top and bottom of the stack in order to protect the outer electrodes and enhance durability of the device.

The stacks are then cut and fired at temperatures of up to 1350° C. or higher, depending on the dielectric used, in order to properly sinter the ceramic dielectric. The ends of the device are then coated or terminated with a conductive metal or mixture, to connect the alternate electrodes within the device.

In an effort to use lower cost materials which do not require the same high temperature properties, metal impregnation techniques have been used whereby fugitive electrodes are screen printed on the green ceramic by means of an ink comprising a carbon powder with a binder and solvent.

After stacking layers of green ceramic and fugitive electrodes, the device is first heated to a low temperature of approximately 350° C. in order to burn out the fugitive electrode ink present. The device is then fired so the ceramic dielectric can properly sinter at temperatures up to 1350° C. This leaves gaps into which true metal electrodes are infiltrated after the dielectric is sintered.

In the case of metal impregnated electrodes, the end termination connects the alternative spaces within the device. Then the device is dipped into a molten metal (for example, lead) bath and the pressure controlled so as to fill molten metal into the layers between the dielectric. The end termination must be performed before the lead impregnation step, in order to prevent the leak of molten lead from the electrode layers when removed from the molten bath.

The advantage of the metal impregnation technique is that lower cost metals can be used as electrodes, because the electrodes are not put in place until after the high temperature sintering of the ceramic dielectric has taken place.

A disadvantage of both methods described above is the numerous processing steps required, including tape preparation, ink mixture, and numerous firing cycles.

If the electrodes are initially printed within the green ceramic, then expensive electrode materials such as platinum and palladium must be used to survive the high sintering temperatures required to sinter the dielectric without oxidizing or otherwise corroding the electrode.

For the metal impregnation method, problems with leaking of the electrode metal and joining leads to the termination ends of the capacitor sometimes occur.

A different type of capacitor is the tantalum type, which is formed by oxidizing a porous tantalum plug to form a tantalum oxide, typically tantalum pentoxide, as a dielectric film coating the tantalum. First, tantalum powder is formed into a shape and sintered into a porous tantalum plug. An electrode wire may be placed into the powder at the time the plug is sintered in order to insure good contact between the electrode and the tantalum.

Second, the tantalum is oxidized so that a dielectric layer of tantalum oxide, presumably tantalum pentoxide, forms on the surface of the tantalum plug. This may be accomplished using an electrolytic process. Then the plug is soaked in a solution of $Mn(NO_3)_2$, which may help to heal any imperfections in the tantalum oxide layer. The plug is then heated and dried, and these steps may be repeated several times to insure an adequate oxide layer coats the surface of tantalum plug.

Third, the dielectric oxide coated plug is soaked in a conductive mixture one or more times to coat the oxide layer. Finally, the plug is dipped into silver paint and dried one or more times. The silver paint acts as a solderable conductor.

One such tantalum type capacitor is described in U.S. Pat. No. 4,160,284 issued to Deffeyes et al., which describes a method for forming capacitors by oxidizing a porous plug of metal to form a dielectric surface and impregnating the plug with a conductive metal paste.

Limitations of the tantalum type capacitor include the complex processing steps and the limited choice of dielectric, since the dielectric is limited to that of oxides of the metal plug. As a result, tantalum type capacitors generally have a fixed capacitance and cannot be used for a wide variety of applications.

It would be desirable to construct a capacitor requiring fewer processing steps than the conventional methods outlined above. For uses where multilayer capacitors are currently used, it would be desirable to omit the dielectric tape formation step. It would also be desirable to eliminate the electrode ink formation and application to the tape. In addition, it would be desirable to lower the sintering temperature requirements, thus allowing the replacement of precious metals with less expensive metals.

Regarding tantalum type capacitors, it would be desirable to be able to use a variety of dielectric materials with the same porous metal plug, in order to fabricate capacitors of varying capacitance, depending on the application desired. It is to these types of objectives that the present invention is directed.

SUMMARY OF THE INVENTION

In accordance with one embodiment of the present invention, there is provided an electrical component comprising a porous mass of electrically conducting material with voids throughout or plug, a sintered ceramic material disposed within voids in the plug and coating the exposed surface of the plug, and two electrodes, with one electrode connected to the electrically conducting material and the other electrode attached to the ceramic coating.

Pursuant to a specific example of an electrical component according to the invention, there is provided a capacitor comprising a porous mass of electrically conducting material with voids throughout, a sintered dielectric material disposed within voids and coating the exposed surface of the porous mass, and two electrodes, with one electrode attached to the electrically conducting material and the other electrode attached to the dielectric coating.

Pursuant to another specific example of an electrical component according to the invention, there is provided a varistor comprising a porous mass of electrically conducting material with voids throughout, a substance which exhibits voltage dependent non-linear resistance, wherein the substance which exhibits voltage dependent non-linear resistance is disposed within voids in the porous mass and coats the exposed surface of the mass, and two electrodes, with one electrode attached to the conducting solid and the other electrode attached to the coating.

In accordance with another aspect of the present invention, there is provided a method for fabricating electrical components comprising the steps of providing a porous mass of electrically conductive material with voids throughout, attaching a first lead to the electrically conductive material, sintering the electrically conductive material, impregnating the voids in the porous mass with a substance that is not an oxide of the metal solid, forming a thin layer of the substance on the surface of the mass, sintering the substance, and attaching a second lead to the surface layer.

Where the electrical component is a capacitor, the steps of the method according to the invention include the use of a dielectric as the ceramic material mentioned above.

Where the electrical component is a varistor, the steps of the method according to the invention include the use of a material exhibiting voltage dependent non-linear resistance as the ceramic material mentioned above.

One significant improvement over the related art with respect to capacitors is that a significantly wider range of dielectrics can be used in the present invention because the dielectric impregnated into the plug is not limited to an oxide of the plug material. Any dielectric which can be impregnated into the sponge structure can be used.

Another improvement of this invention over the related art is that any metal or alloy which does not oxidize at temperatures necessary to sinter the ceramic can be used as the plug material. Inexpensive plug metals may be used when the dielectric used is of the type which can be sintered at a low temperature in an oxidizing atmosphere or the type which can be sintered in a non-oxidizing atmosphere.

BRIEF DESCRIPTION OF THE DRAWING

Further objects, advantages and features of the present invention will become apparent from the detailed description, below, when read in conjunction with the accompanying drawing in which the single FIGURE is a cross section of one embodiment of a capacitor manufactured according to this invention.

DETAILED DESCRIPTION OF THE PREFERRED EMBODIMENTS

Figure 1:
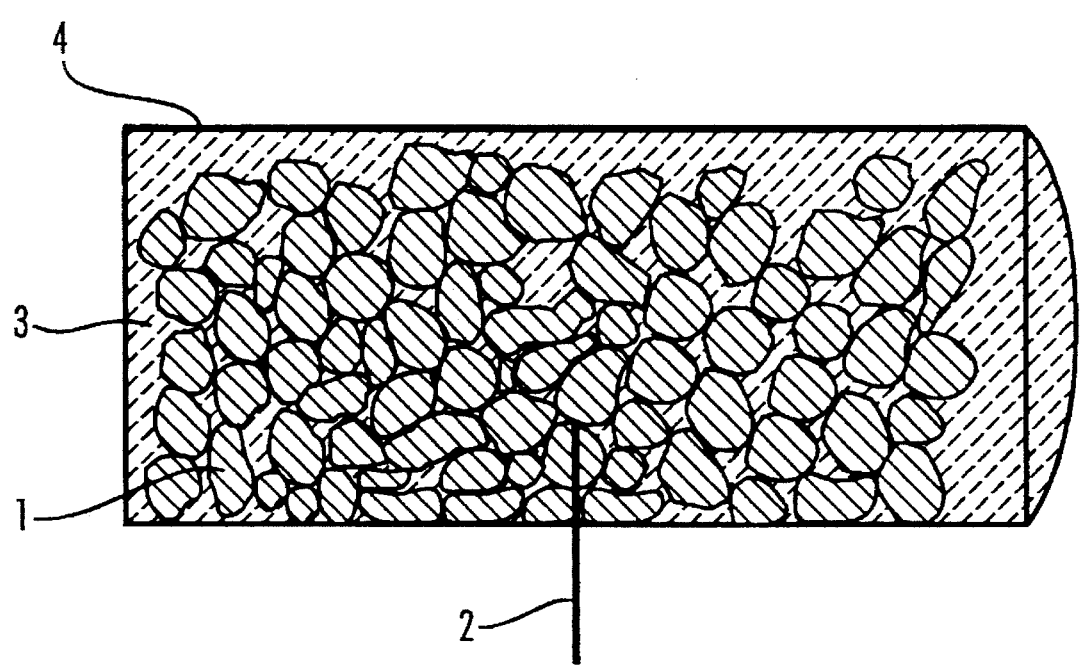

The following description is the best mode contemplated for carrying out the present invention. This description is made for the purpose of illustrating the principles of the invention and should not be taken in a limiting sense. The scope of the invention should be determined by reference to the appended claims.

Although it will be evident to those skilled in the art that the principles of the invention are applicable to a variety of electrical components and to methods for their fabrication, the following detailed description will focus chiefly on capacitors as an example.

The drawing illustrates a cross sectional view of a capacitor in accordance with the invention having one preferred geometry. Capacitors according to the invention may have other geometries; they may take the form, for example, of a cylinder, sphere, rectangular prism or cube.

The capacitor illustrated in the drawing comprises a porous mass of electrically conductive material or plug 1, a first electrode 2, a dielectric 3, and a second electrode 4.

The plug 1 may be formed from a variety of metals, including, but not limited to silver, palladium, platinum, gold, manganese, tungsten or any other metal or alloy which does not significantly oxidize at temperatures near the dielectric sintering temperature can also be used as a plug material. Flaked powder may be used to construct the plug, in order to help control the drying characteristics and shrinkage of the plug.

One preferred embodiment has little or no oxidation of the plug occurring at all. For example, both silver and palladium will oxidize at relatively low temperatures, then revert back to pure metal at higher temperatures. If the firing conditions to make the capacitor are at these higher temperatures, then a plug constructed of silver or palladium will show little or no oxidation.

In other embodiments, slight oxidation may occur, which is not necessarily detrimental to the system because it may aid in forming a good bond between the porous mass of metal and the dielectric material. If the oxidation layer is too thick, though, then complication will result from having a layer of insulating material between the metal and impregnated dielectric. Whether oxidation will occur is dependent on such things as the plug material chosen, the temperatures the plug is exposed to, and the atmosphere in which heating occurs.

If the dielectric used is such that it can be sintered in a non-oxidizing (reducing) atmosphere, then metals including, but not limited to, Ni, Cu, Pb, and Zn can be used for the porous plug material.

The first electrode 2 is attached directly to the plug 1. The dielectric 3 is located in voids in the plug 1 and in a thin layer coating the plug 1. The second electrode 4 is attached directly to the layer of dielectric 3 coating the plug 1.

If the dielectric is such that it can be fired in a non-oxidizing atmosphere, then metals including, but not limited to, Ni, Cu, Pb, and Zn can be used for the porous plug material. Similarly, in an oxidizing atmosphere, any metal which does not significantly oxidize at the dielectric sintering temperature can be used as a plug material.

In fabricating the plug, a variety of metal powders may be used, including those metals listed above. The powder is pressed in a die at a relatively low pressure of approximately 2 Kpsi. The low pressure allows for the presence of irregular voids, hence the spongy structure of the plug 1. The porosity of the plug may range from approximately 25% to 95%.

An electrode wire 2 may be inserted into the center of the plug 1 while the plug 1 is still in the green state. Then upon sintering the plug, there will be an intimate electrical contact formed between the plug and the electrode. It is not a necessity that the electrode wire be inserted into the center of the plug prior to sintering the plug. The important factor is that the electrode make good electrical contact with the plug.

The plug 1 is then sintered. Depending on the metal used, the sintering temperature may be approximately 800° C. One firing cycle which can be used is to heat the furnace up to 800° C. over 30 minutes, hold at 800° C. for 4–5 minutes, then cool down over 4–5 minutes. This heating cycle can be achieved using a variety of furnace types, including a belt type furnace. The firing temperature may vary depending on the plug 1 material.

After sintering, the plug 1 is impregnated with the dielectric 3. The dielectric 3 may be in the form of a sol from sol-gel processing. One way to impregnate the plug 1 is to place the plug 1 into a vacuum chamber and maintained a vacuum on the order of $10^{-3}$ atm. The sol is then introduced into the chamber to infiltrate and coat the plug 1. A pressure of approximately 200–300 psi is then introduced into the chamber using nitrogen gas as the preferred pressuring medium, though other gases could be used. The pressure is applied for approximately five minutes. The pressure acts to force the sol into the porous surfaces of the plug. Then the plug 1 is removed and heat treated at 300° C., to burn out the organic components of the sol and leave the inorganic dielectric material. Depending on the viscosity and concentration of the impregnant, a vacuum method for impregnation may not be necessary, and a simpler method such as dipping the plug into the impregnant and applying pressure, if necessary, may suffice to adequately infiltrate the plug.

The procedure of vacuum impregnation, pressure, and heat treatment may be repeated more than once, depending on the viscosity and concentration of the sol, in order to get adequate dielectric infiltration within the plug and dielectric thickness on the surface of the plug. Typical thicknesses may range from submicron to 5 microns or greater, depending on the materials used and the application.

The plug 1 can also be impregnated with a slurry or some other form of penetrant to make the dielectric layer. The process does not require the use of a sol.

The porosity of the infiltrated plug may vary as well. If possible full infiltration into all pores is desired, but in practice this may be difficult to achieve because, for example, there may be regions of porosity in the plug which are inaccessible to the dielectric 3 due to structural constraints.

After the last impregnation cycle the final sintering step is carried out by heating the plug 1 to a temperature sufficient to sinter the dielectric 3, which may, depending on the dielectric, be approximately 850° C. One firing cycle which can be used is to heat to 850° C. in 2 hours, hold at 850° C. for 30 minutes, then cool over 4 to 8 hours in the furnace. The sintering temperature necessary for the dielectric coming from the sol is less than that necessary for sintering the dielectric fabricated by tape casting, as used in conventional multilayer capacitors.

The second electrode 4 is then applied to the surface of the plug by sputtering. It is important to deposit the second electrode 4 only on the dielectric 3, without contacting the first electrode 2. Otherwise, the capacitor may short out electrically. The second electrode 4 can be applied by means other than sputtering, such as through application of conducting epoxy, or any thick or thin film deposition technique, including, but not limited to screen printing, dipping, electrophoretic coating, electron beam deposition, and vacuum deposition. Depending on the use of the capacitor, the second electrode 4 may also be impregnated by using a liquid form and sintering, for example. Any conducting material could potentially be used as an electrode material.

In one embodiment, the plug 1 is made from palladium powder which has a very high surface area (20 meters²/gram), and an average particle size of approximately 2–4 microns. The powder contains palladium flakes, which have a large surface area and help control the shrinkage and porosity of the plug. The palladium is pressed into the plug 1 shape at pressures of 2–3K psi.

An electrode wire 2 is inserted into the center of the palladium plug 1 while the plug 1 is still in the green state. The plug 1 is then sintered at approximately 800° C. for 4 to 5 minutes. The sintering heat treatment is carried out in air in a belt furnace, where the sample is heated up to 800° C. over 30 minutes, held at 800° C. for 4–5 minutes, then cooled down over 4–5 minutes. After this sintering treatment the palladium plug 1 has a density of approximately 40–60% of the theoretical density of palladium.

Next the palladium plug 1 is impregnated with a sol of PZT (lead/zirconia titanate in a 1:1 ratio). The palladium plug 1 is placed into an open container inside a vacuum chamber and a vacuum maintained on the order of $10^{-3}$ atm. The sol is introduced into the chamber, such that it fills the container enough to coat the plug. Then a pressure of approximately 200–300 psi is introduced into the chamber, using nitrogen gas as the pressuring medium. The pressure is applied for approximately five minutes, in order to force the sol into the porous surface of the plug. The plug 1 is then removed from the chamber and heat treated at 300° C. in order to burn out the organics from the sol, leaving the dielectric in an unsintered state. The procedure of vacuum impregnation, pressure, and heat treatment may be repeated three times, in order to get an adequate dielectric 3 thickness, which typically ranges from submicron to 5 microns depending on the application.

Final sintering of the palladium plug 1 with impregnated PZT dielectric 3 is then carried out in a box furnace by heating the furnace to 850° C. in 2 hours, holding at 850° C. for 30 minutes, then cooling in the furnace over 4–8 hours. The second electrode 4, made up of silver, palladium, nickel, or an alloy, is then sputtered onto the dielectric 3, thus creating the capacitor.

Other embodiments fabricated by the same method as described above include capacitors constructed using palladium or silver as the plug 1 material and $BaTiO_3$ or $SrTiO_3$ as the sol and dielectric 3 material.

Another embodiment uses silver and AVICEL (a trademark for a cellulose material manufactured by FMC Corporation), whereby a mixture of 80% silver and 20% AVICEL powders is used for the plug 1 material. This mixture is fabricated as above, except that the initial sintering of the plug 1, prior to impregnation, is carried out at 800° C. for 15 minutes. The AVICEL is an organic material consisting of microcrystalline cellulose needles. After mixing with the plug metal, the AVICEL will burn out of the structure at about 400° C. leaving porosity in its place. Depending on the desired porosity of the plug, varying amounts of AVICEL can be added to the initial plug mixture. The plug could be constructed from any conducting material, organic or inorganic, although a relatively low sintering temperature dielectric would be necessary for an organic plug material or else it would melt.

Based on the above description, one skilled in the art will understand that many modifications may be made without departing from the scope of the invention. First, it is apparent that the present invention is not limited to the materials and techniques mentioned above. For example, the plug could be made up of a cellular ceramic coated with metal. In addition, any material which does not oxidize or degrade at the temperatures used to sinter the dielectric may be a suitable plug 1 material. The sintering temperature may vary considerably depending on the atmosphere the plug 1 is sintered in, plug material and the dielectric 3 used.

Furthermore, the dielectric 3 can be any dielectric material processed by any suitable technique which can be impregnated into the sponge structure of the plug 1, including but not limited to a dielectric slurry, organometallic material, sol from a sol-gel process, or a homogeneous solution of desired inorganic dielectric.

In addition, a variety of methods of infiltration could be used to impregnate the dielectric 3 into the sponge 1. In another aspect, the electrodes can be any conducting material.

It is also possible to have a capacitor structure containing more than one such impregnated and coated plug whereby the individual impregnated and coated plugs are connected to each other to form a larger capacitor.

As already stated, it will be obvious to one of ordinary skill that the present invention can also be applied to manufacture other types of electrical components, including varistors and sensors, and to their methods of manufacture. For example, by using a material exhibiting voltage dependent non-linear resistance, such as a zinc oxide based varistor composition, as the impregnant, a varistor can readily be fabricated using the same basic technique as described above for capacitors. Other ceramic or non-ceramic impregnants could also be used to construct electrical devices.

As a result, the scope of the present invention extends to a variety of materials, methods of fabrication, types of devices and processing techniques which can be used to manufacture electrical components by impregnating a porous sponge or plug as disclosed above.

What is claimed is:

1. An electrical component comprising:
   a mass containing sintered metal particles which define pores in the mass, the mass having an outer surface;
   an impregnant located within pores in the mass, the impregnant comprising a ceramic dielectric, the impregnant also forming a layer on the outer surface of the mass, wherein the ceramic dielectric is not an oxide of sintered metal particles;
   a first electrode connected to the metal particles; and
   a second electrode connected to the ceramic dielectric.

2. An electrical component as defined in claim 1, wherein the mass has a geometric shape selected from the group consisting of a cylinder, sphere, rectangular prism, or a cube.

3. An electronic component as defined in claim 1, wherein the metal particles comprise at least one of the elements selected from the group consisting of silver, palladium, platinum, gold, nickel, manganese, tungsten, copper, lead and zinc.

4. An electronic component as defined in claim 1, wherein the ceramic dielectric is sintered and the metal particles comprise any metal which does not oxidize at the sintering temperature of the ceramic dielectric.

5. A capacitor comprising:
   a porous plug of sintered metal particles and having an outer surface, wherein the pores are defined by sintered metal particles in the plug;
   an impregnant comprising a dielectric material, the impregnant located within pores in the porous plug and the impregnant forming a layer on the outer surface of the plug, wherein the dielectric material is not an oxide of the electrically conductive material;
   a first electrode connected to the metal particles;
   a second electrode connected to the dielectric material;
   wherein the dielectric material is sintered; and
   the metal comprises any metal which does not oxidize at the sintering temperature of the dielectric material.

6. A capacitor as defined in claim 5, wherein the dielectric is at least one selected from the group consisting of a dielectric slurry, organometallic material, sol from a sol-gel process, or a homogeneous solution of inorganic dielectric.

7. A capacitor as defined in claim 5, wherein the plug has a geometric shape selected from the group consisting of a cylinder, sphere, rectangular prism, or a cube.

8. A capacitor as defined in claim 5, wherein the metal comprises at least one of the elements selected from the group consisting of silver, palladium, platinum, gold, nickel, manganese, tungsten, copper, lead, and zinc.

9. A capacitor comprising:
   a porous plug of sintered metal particles and having an outer surface, wherein the pores are defined by sintered metal particles in the plug;
   an impregnant comprising a dielectric material, the impregnant located within pores in the porous plug and the impregnant forming a layer on the outer surface of the plug, wherein the dielectric material is not an oxide of the electrically conductive material;
   a first electrode connected to the metal particles;
   a second electrode connected to dielectric the material; and
   wherein the dielectric is a titanate material selected from the group consisting of lead zirconium titanate, barium titanate, and strontium titanate.

10. A process for making an electronic component comprising:
    forming a porous mass having an outer surface, the mass formed by compacting and sintering metal particles and producing pores defined by sintered metal particles;
    attaching a first electrode to particles of the metal;
    forming a layer of a ceramic dielectric material on the porous mass, wherein the layer is formed within pores in the porous mass and on the outer surface of the mass, wherein the layer is formed by impregnating said porous mass with said ceramic dielectric material; and
    attaching a second electrode to the ceramic dielectric material.

11. A method for manufacturing an electrical component comprising the steps of:
    compacting and sintering metal particles to form a plug having pores between sintered metal particles in the plug;
    forming a ceramic dielectric layer on particles of the plug;
    wherein the formation of the ceramic dielectric layer comprises the step of impregnating a dielectric slurry into pores in the plug; and
    attaching a first electrode to a plurality of the metal particles and a second electrode to the ceramic dielectric.

12. A method for manufacturing an electrical component comprising the steps of:
    compacting and sintering metal particles to form a plug having pores between sintered metal particles in the plug;

forming a ceramic dielectric layer on particles of the plug;

wherein the formation of the ceramic dielectric layer comprises the step of impregnating an organometallic material into pores in the plug; and attaching a first electrode to a plurality of the metal particles and a second electrode to the ceramic dielectric.

13. A method for manufacturing an electrical component comprising the steps of:

compacting and sintering metal particles to form a plug having pores between sintered metal particles in the plug;

forming a ceramic dielectric layer on particles of the plug;

wherein the formation of the ceramic dielectric layer comprises the step of impregnating a sol from a sol-gel mixture into pores in the plug; and attaching a first electrode to a plurality of the metal particles and a second electrode to the ceramic dielectric.

14. A method for manufacturing an electrical component comprising the steps of:

compacting and sintering metal particles to form a plug having pores between sintered metal particles in the plug;

forming a ceramic dielectric layer on particles of the plug;

wherein the formation of the ceramic dielectric layer comprises the step of impregnating a homogenous solution of inorganic dielectric into pores in the plug; and attaching a first electrode to a plurality of the metal particles and a second electrode to the ceramic dielectric.

15. A process for forming an electrical component comprising the steps of:

fabricating an unfired plug from metal particles and a first material;

heating the unfired plug to burn out the first material and form pores within the plug in the volume formerly occupied by the first material;

sintering the metal particles to form a sintered porous plug having pores between a plurality of sintered metal particles;

impregnating a plurality of the pores with a second material comprising a ceramic dielectric material;

coating the plug with a layer of the second material; and attaching a first electrode to a plurality of the metal particles and a second electrode to the ceramic dielectric material.

* * * * *

UNITED STATES PATENT AND TRADEMARK OFFICE
CERTIFICATE OF CORRECTION

PATENT NO. : 5,495,386
DATED : 2/27/96
INVENTOR(S) : Sudhir Kulkarni

It is certified that error appears in the above-indentified patent and that said Letters Patent is hereby corrected as shown below:

Claim 1, column 7, line 47, insert --the-- between "of" and "sintered".

Claim 5, column 8, line 5, delete "electrically conductive material" and insert --metal particles--.

Claim 9, column 8, line 30, delete "electrically conductive material" and insert --metal particles--.

Claim 9, column 8, line 32, delete "the" between "dielectric" and "material", and insert --the-- between "to" and "dielectric".

Signed and Sealed this

Twenty-fifth Day of June, 1996

Attest:

BRUCE LEHMAN

Attesting Officer

Commissioner of Patents and Trademarks